(12) United States Patent
Lee et al.

(10) Patent No.: US 11,347,705 B2
(45) Date of Patent: May 31, 2022

(54) SUPPORTING SCALABLE DISTRIBUTED SECONDARY INDEX USING REPLICATION ENGINE FOR HIGH-PERFORMANCE DISTRIBUTED DATABASE SYSTEMS

(71) Applicant: SAP SE, Walldorf (DE)

(72) Inventors: Juchang Lee, Seoul (KR); Hyejeong Lee, Seoul (KR); Kyu Hwan Kim, Seoul (KR); Friedrich Keller, Karlsruhe (DE); Mihnea Andrei, Issy les Moulineoux (FR)

(73) Assignee: SAP SE, Walldorf (DE)

( * ) Notice: Subject to any disclaimer, the term of this patent is extended or adjusted under 35 U.S.C. 154(b) by 203 days.

(21) Appl. No.: 16/372,644

(22) Filed: Apr. 2, 2019

(65) Prior Publication Data

US 2020/0320051 A1  Oct. 8, 2020

(51) Int. Cl.
*G06F 16/22* (2019.01)
*G06F 16/27* (2019.01)

(52) U.S. Cl.
CPC ...... *G06F 16/2228* (2019.01); *G06F 16/2282* (2019.01); *G06F 16/278* (2019.01)

(58) Field of Classification Search
CPC . G06F 16/2228; G06F 16/2282; G06F 16/278
See application file for complete search history.

(56) References Cited

U.S. PATENT DOCUMENTS

| 5,515,531 A * | 5/1996 | Fujiwara ........... G06F 16/24524 |
| | | 707/999.003 |
| 7,305,421 B2 | 12/2007 | Cha et al. |
| 8,442,962 B2 | 5/2013 | Lee et al. |
| 8,700,660 B2 | 4/2014 | Lee et al. |
| 8,768,927 B2 | 7/2014 | Yoon et al. |
| 8,782,100 B2 | 7/2014 | Yoon et al. |
| 8,935,205 B2 | 1/2015 | Hildenbrand et al. |
| 9,037,677 B2 | 5/2015 | Lee et al. |
| 9,063,969 B2 | 6/2015 | Lee et al. |

(Continued)

FOREIGN PATENT DOCUMENTS

EP 3182300 6/2017

OTHER PUBLICATIONS

Extended European Search Report issued in European Application No. 19215341.9 dated Jun. 8, 2020, 9 pages.

(Continued)

*Primary Examiner* — Kannan Shanmugasundaram
(74) *Attorney, Agent, or Firm* — Fish & Richardson P.C.

(57) ABSTRACT

Implementations of the present disclosure include providing, at each node in a set of nodes of a database system, a table partition of a plurality of table partitions, the plurality of table partitions being provided by partitioning a table using a primary key, providing, at each node in the set of nodes of the database system, a secondary index partition of a plurality of secondary index partitions, each secondary index partition including a replicate table of at least a portion of the table, the plurality of secondary index partitions being provided by partitioning the table using one or more secondary keys, and for at least one operation executed on a table partition, executing a replication protocol to replicate the at least one operation on a secondary index partition that corresponds to the table partition.

20 Claims, 9 Drawing Sheets

(56) References Cited

U.S. PATENT DOCUMENTS

| | | | |
|---|---|---|---|
| 9,098,522 B2 | 8/2015 | Lee et al. |
| 9,171,020 B2 | 10/2015 | Faerber et al. |
| 9,336,262 B2 | 5/2016 | Lee et al. |
| 9,336,284 B2 | 5/2016 | Lee et al. |
| 9,465,829 B2 | 10/2016 | Faerber et al. |
| 9,465,843 B2 | 10/2016 | Yoon et al. |
| 9,465,844 B2 | 10/2016 | Faerber et al. |
| 9,483,516 B2 | 11/2016 | Lee et al. |
| 9,501,502 B2 | 11/2016 | Lee et al. |
| 9,558,229 B2 | 1/2017 | Lee et al. |
| 9,594,799 B2 | 3/2017 | Faerber et al. |
| 9,635,093 B2 | 4/2017 | Lee et al. |
| 9,665,609 B2 | 5/2017 | Andrei et al. |
| 9,720,949 B2 | 8/2017 | Lee et al. |
| 9,720,992 B2 | 8/2017 | Lee et al. |
| 9,778,991 B2 | 10/2017 | Schreter et al. |
| 9,779,104 B2 | 10/2017 | Andrei et al. |
| 9,792,318 B2 | 10/2017 | Schreter et al. |
| 9,798,759 B2 | 10/2017 | Schreter et al. |
| 9,805,074 B2 | 10/2017 | Lee et al. |
| 9,824,134 B2 | 11/2017 | Schreter et al. |
| 9,830,109 B2 | 11/2017 | Wein et al. |
| 9,886,464 B2 | 2/2018 | Blanco et al. |
| 9,891,831 B2 | 2/2018 | Legler et al. |
| 9,953,050 B2 | 4/2018 | Andrei et al. |
| 9,965,360 B2 | 5/2018 | Lee et al. |
| 9,965,513 B2 | 5/2018 | Lee et al. |
| 9,977,801 B2 | 5/2018 | Florendo et al. |
| 9,977,802 B2 | 5/2018 | Florendo et al. |
| 10,042,552 B2 | 8/2018 | Blanco et al. |
| 10,042,910 B2 | 8/2018 | Bensberg et al. |
| 10,055,440 B2 | 8/2018 | Bensberg et al. |
| 10,089,342 B2 | 10/2018 | Sherkat et al. |
| 10,095,764 B2 | 10/2018 | Park et al. |
| 10,102,120 B2 | 10/2018 | Lee et al. |
| 10,127,260 B2 | 11/2018 | Goel et al. |
| 10,140,326 B2 | 11/2018 | Sherkat et al. |
| 10,162,710 B2 | 12/2018 | Kwon et al. |
| 10,162,766 B2 | 12/2018 | Faerber et al. |
| 10,169,439 B2 | 1/2019 | Lee et al. |
| 10,185,737 B2 | 1/2019 | Renkes et al. |
| 10,191,765 B2 | 1/2019 | Kim et al. |
| 10,235,440 B2 | 3/2019 | Lee et al. |
| 2008/0306990 A1* | 12/2008 | Grosman | G06F 16/278 707/999.102 |
| 2014/0222418 A1 | 8/2014 | Richtarsky et al. |
| 2015/0052150 A1 | 2/2015 | Sharique et al. |
| 2015/0046413 A1 | 5/2015 | Andrei et al. |
| 2015/0149736 A1 | 5/2015 | Kwon et al. |
| 2016/0147617 A1 | 5/2016 | Lee et al. |
| 2016/0147801 A1 | 5/2016 | Wein et al. |
| 2016/0147804 A1 | 5/2016 | Wein et al. |
| 2016/0147813 A1 | 5/2016 | Lee et al. |
| 2016/0188690 A1* | 6/2016 | Tan | G06F 16/162 707/613 |
| 2016/0350392 A1 | 12/2016 | Rice et al. |
| 2016/0364440 A1 | 12/2016 | Lee et al. |
| 2016/0371356 A1 | 12/2016 | Lee et al. |
| 2017/0083538 A1 | 3/2017 | Tonder et al. |
| 2017/0147225 A1 | 5/2017 | Geissinger et al. |
| 2017/0147628 A1 | 5/2017 | Park et al. |
| 2017/0147638 A1 | 5/2017 | Park et al. |
| 2017/0147671 A1 | 5/2017 | Bensberg et al. |
| 2017/0177658 A1* | 6/2017 | Lee | G06F 16/275 |
| 2017/0177697 A1 | 6/2017 | Lee et al. |
| 2017/0322972 A1 | 11/2017 | Lee et al. |
| 2017/0364554 A1 | 12/2017 | Nica et al. |
| 2017/0371909 A1 | 12/2017 | Andrei et al. |
| 2018/0013692 A1 | 1/2018 | Park et al. |
| 2018/0074919 A1 | 3/2018 | Lee et al. |
| 2018/0075083 A1 | 3/2018 | Lee et al. |
| 2018/0150496 A1 | 5/2018 | Kim et al. |
| 2018/0150504 A1 | 5/2018 | Lee et al. |
| 2018/0150539 A1 | 5/2018 | Andrei et al. |
| 2018/0150540 A1 | 5/2018 | Florendo et al. |
| 2018/0203874 A1* | 7/2018 | Gkoufas | G06F 16/148 |
| 2018/0232412 A1 | 8/2018 | Bensberg et al. |
| 2018/0246807 A1 | 8/2018 | Andrei et al. |
| 2018/0246928 A1 | 8/2018 | Kim et al. |
| 2018/0246945 A1 | 8/2018 | Lee et al. |
| 2018/0253473 A1 | 9/2018 | Ziegler et al. |
| 2018/0322156 A1 | 11/2018 | Lee et al. |
| 2018/0322157 A1 | 11/2018 | Lee et al. |
| 2018/0329941 A1 | 11/2018 | Nica et al. |
| 2018/0329974 A1 | 11/2018 | Bensberg et al. |
| 2018/0336229 A1 | 11/2018 | Muehle et al. |
| 2018/0336258 A1 | 11/2018 | Lee et al. |
| 2018/0349418 A1 | 12/2018 | Lee et al. |
| 2018/0349430 A1 | 12/2018 | Lee et al. |
| 2018/0357298 A1 | 12/2018 | Andrei et al. |
| 2019/0026387 A1 | 1/2019 | Zhou et al. |
| 2019/0065573 A1 | 2/2019 | Keller |
| 2019/0108174 A1* | 4/2019 | Du | G06F 16/2282 |

OTHER PUBLICATIONS

Mohiuddin et al., "A comparative study of secondary indexing techniques in LSM-based NoSQL databases." Proceedings of the 2018 International Conference on Management of Data, May 27, 2018, 16 pages.

U.S. Appl. No. 15/944,429, filed Apr. 3, 2018, Lee et al.

U.S. Appl. No. 15/976,441, filed May 10, 2018, Park et al.

Azure.Microsoft.com [online], "Azure Cosmos DB: Globally Distributed, Multi-Model Database Service," Microsoft Azure Products, [retrieved on Mar. 26, 2019], retrieved from: URL <https://azure.microsoft.com/en-us/services/cosmos-db/>, 23 pages.

Baker et al., "Megastore: Providing Scalable, Highly Available Storage for Interactive Services," Proceedings of the Conference on Innovative Data system Research (CIDR), Asilomar, CA, USA, Jan. 2011, 12 pages.

Binnig et al., "Distributed Snapshot Isolation: Global Transactions Pay Globally, Local Transactions Pay Locally," The VLDB Journal, vol. 23, Issue 6, Dec. 2014, 30 pages.

Bore-Wuesthof [online], "Introduction: High Availability for SAP HANA," SAP Community Archives: SAP HANA and In-Memory Computing, Jan. 27, 2016, [retrieved on Mar. 26, 2019], retrieved from: URL<https://archive.sap.com/documents/docs/DOC-65585>, 17 pages.

Bronson et al., "TAO: Facebook's Distributed Data Store for the Social Graph," USENIX Annual Technical Conference, San Jose, CA, USA, Jun. 2013, 12 pages.

Cai et al., "Efficient Distributed Memory Management with RDMA and Caching," Proceedings of the VLDB Endowment, vol. 11, Issue 11, Jul. 2018, 14 pages.

Cloud.Google.com [online], "Cloud Spanner," Google Cloud Database Products, [retrieved on Mar. 26, 2019], retrieved from: URL <https://cloud.google.com/spanner/>, 11 pages.

Corbett et al., "Spanner: Google's Globally-Distributed Database," ACM Transactions on Computer Systems (TOCS), vol. 31, Issue 3, Aug. 2013, 22 pages.

DeCandia, "Dynamo: Amazon's Highly Available Key-value Store," ACM SIGOPS operating systems review, vol. 41, Issue 6, Oct. 2007, 16 pages.

Docs.Oracle.com [online], "Distributed Transactions Concepts," Oracle Database Online Documentation Library, 11g Release 2 (11.2): Database Administrator's Guide, 2015, [retrieved on Mar. 26, 2019], retrieved from: URL<https://docs.oracle.com/cd/E11882_01/server.112/e25494/ds_txns.htm>, 21 pages.

Docs.Oracle.com [online], "Introduction to Oracle Database Advanced Queuing," Oracle Database Online Documentation Library 12c Release 1 (12.1.0.2): Database Advanced Queuing User's Guide, 2014, [retrieved on Mar. 26, 2019], retrieved from: URL <https://docs.oracle.com/cd/E11882_01/server.112/e25494/ds_txns.htm>, 45 pages.

Intl.Cloud.Tencent.com [online], "Distributed Cloud Database," Tencent Cloud DCDB Product Overview, 2019 [retrieved on Mar. 26, 2019], retrieved from: URL<https://intl.cloud.tencent.com/product/dcdb>, 3 pages.

(56) References Cited

OTHER PUBLICATIONS

Lee et al.,"Parallel Replication across Formats in SAP HANA for Scaling Out Mixed OLTP/OLAP Workloads," Proceedings of the VLDB Endowment, vol. 10, Issue 12, Aug. 2017, 12 pages.

Lee et al., "Parallel Replication across Formats for Scaling Out Mixed OLTP/OLAP Workloads in Main-Memory Databases," The VLDB Journal, vol. 27, Issue 3, Jun. 2018, 26 pages.

Lee et al., "SAP HANA Distributed in-Memory Database System: Transaction, Session, and Metadata Management," 2013 IEEE 29th International Conference on Data Engineering (ICDE), Apr. 2013, 9 pages.

Mukherjee et al., "Distributed Architecture of Oracle Database in-Memory," Proceedings of the VLDB Endowment, vol. 8, Issue 12, Aug. 2015, 12 pages.

Patterson et al, "Serializability, not serial: Concurrency control and availability in multi-datacenter datastores." Proceedings of the VLDB Endowment, vol. 5, Issue 11, Jul. 2012, 12 pages.

Scylladb.com [online], "Scylla: The Real-Time Big Data Database," Scylla Product Overview, 2019, [retrieved on Mar. 26, 2019], retrieved from: URL<https://www.scylladb.com/>, 11 pages.

Shute, "F1: A Distributed SQL Database that Scales," Proceedings of the VLDB Endowment, vol. 6, Issue 11, Aug. 2013, 12 pages.

Wolter [online], "Building Reliable, Asynchronous Database Applications Using Service Broker," Microsoft.com, Jun. 2005 (last updated), [retrieved on Mar. 26, 2019], retrieved from: URL <https://technet.microsoft.com/en-us/library/ms345113>, 16 pages.

Zhang et al., "Distributed Processing and Transaction Replication in MonetDB-Towards a Scalable Analytical Database System in the Cloud," Final Public Workshop from LeanBigData and CoherentPaaS (in conjunction with the DISCOTEC16 conference), Heraklion, Greece, Jun. 2016, 15 pages.

\* cited by examiner

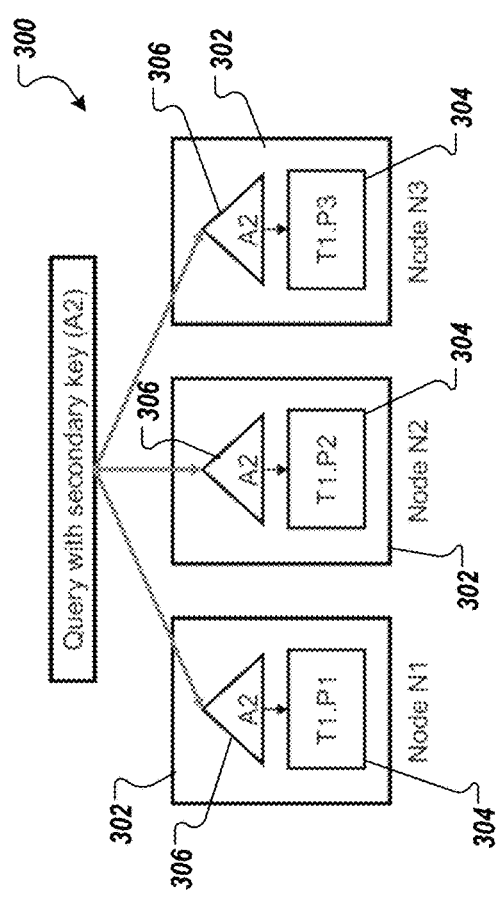
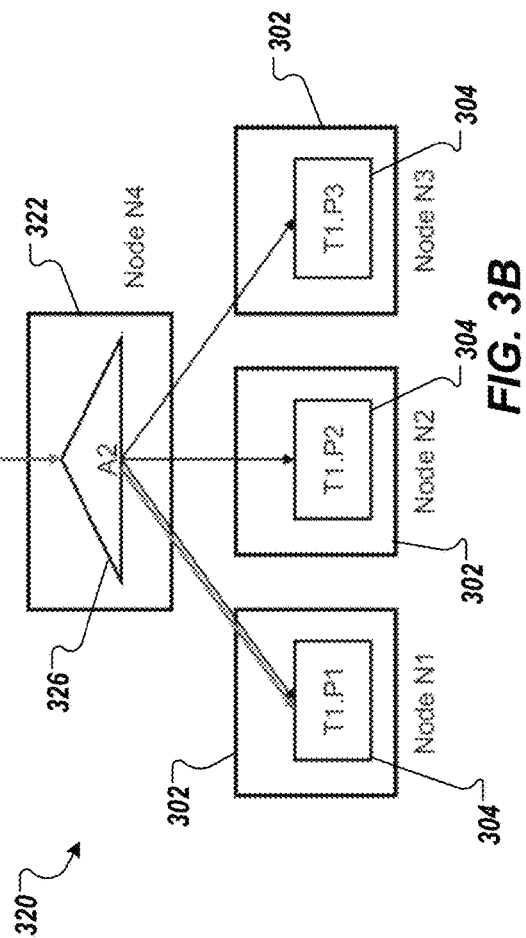
FIG. 3A
FIG. 3B

SUPPORTING SCALABLE DISTRIBUTED SECONDARY INDEX USING REPLICATION ENGINE FOR HIGH-PERFORMANCE DISTRIBUTED DATABASE SYSTEMS

BACKGROUND

Database systems are used to store data and enable queries over the stored data to be executed. For example, a user can submit a query to a database system, which processes the query to provide a query result, the query result including data stored within the database system that is responsive to the query. Typically, data is stored in tables within the database system. In some examples, a table can include a primary index, which indexes fields (columns) of the table, is guaranteed to not contain duplicates, and includes a primary key that is unique.

In some instances, a database system can be distributed and can include multiple nodes, over which tables can be partitioned. For example, a table (T) can be partitioned into multiple partitions (T, P1; T, P2) using a primary key (e.g., a column of the partitioned table), as a partition key. Each partition is stored in a respective node. In such systems, a query can indicate the primary key, which is cross-referenced to a primary index of the table to determine which partition to search for to provide a response to the query (e.g., which node that the appropriate partition is stored in). In some instances, however, a query can include a non-primary key, also referred to as a secondary key, which can be considered any other key that is not the primary key. In some examples, the non-primary key can include a so-called foreign key. More particularly, a foreign key can be described as being defined in a second partition (table) and referring to the primary key of a first partition (table).

To enable use of secondary keys in querying partitioned tables, a secondary index can be provided. A secondary index enables efficient access to records in a partitioned database using secondary keys. However, implementing and maintaining a secondary index can be inefficient in terms of technical resources. For example, changes in data records in partitioned tables require updates to a secondary index.

SUMMARY

Implementations of the present disclosure include computer-implemented methods for supporting scalable secondary indexes in distributed database systems. More particularly, implementations of the present disclosure are directed to using a replication engine to support scalable secondary indexes in distributed database systems.

In some implementations, actions include providing, at each node in a set of nodes of a database system, a table partition of a plurality of table partitions, the plurality of table partitions being provided by partitioning a table using a primary key, providing, at each node in the set of nodes of the database system, a secondary index partition of a plurality of secondary index partitions, each secondary index partition including a replicate table of at least a portion of the table, the plurality of secondary index partitions being provided by partitioning the table using one or more secondary keys, and for at least one operation executed on a table partition, executing a replication protocol to replicate the at least one operation on a secondary index partition that corresponds to the table partition. Other implementations include corresponding systems, apparatus, and computer programs, configured to perform the actions of the methods, encoded on computer storage devices.

These and other implementations may each optionally include one or more of the following features: a first secondary index partition includes a first set of columns of the table and a second secondary index partition includes a second set of columns of the table, the first set of columns being different from the second set of columns; the replication protocol includes an asynchronous replication protocol that is absent a multi-phase commit for committing one or more changes to the table partition that result from the at least one operation to the table partition and the secondary index partition that corresponds to the table partition; the replication protocol executes an asynchronous replication of the one or more changes prior to committing the one or more changes to the table partition and the secondary index partition that corresponds to the table partition; the replication protocol includes a synchronous replication protocol that ensures the one or more changes are represented in the secondary index partition that corresponds to the table partition prior to committing the one or more changes to the table partition and the secondary index partition that corresponds to the table partition; the replication protocol executes a multi-phase commit for committing the one or more changes to the table partition and the secondary index partition that corresponds to the table partition; and the secondary index partitions of the plurality of secondary index partitions collectively define a global secondary index of the table.

The present disclosure also provides one or more non-transitory computer-readable storage media coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure may include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

FIGS. 3A-3C depict example indexing architectures.

Like reference symbols in the various drawings indicate like elements.

DETAILED DESCRIPTION

Implementations of the present disclosure include computer-implemented methods for supporting scalable secondary indexes in distributed database systems. More particularly, implementations of the present disclosure are directed to using a replication engine to support scalable secondary indexes in distributed database systems. In some implementations, actions include providing, at each node in a set of nodes of a database system, a table partition of a plurality of table partitions, the plurality of table partitions being provided by partitioning a table using a primary key, providing, at each node in the set of nodes of the database system, a secondary index partition of a plurality of secondary index partitions, each secondary index partition including a replicate table of at least a portion of the table, the plurality of secondary index partitions being provided by partitioning the table using one or more secondary keys, and for at least one operation executed on a table partition, executing a replication protocol to replicate the at least one operation on a secondary index partition that corresponds to the table partition.

Figure 1:
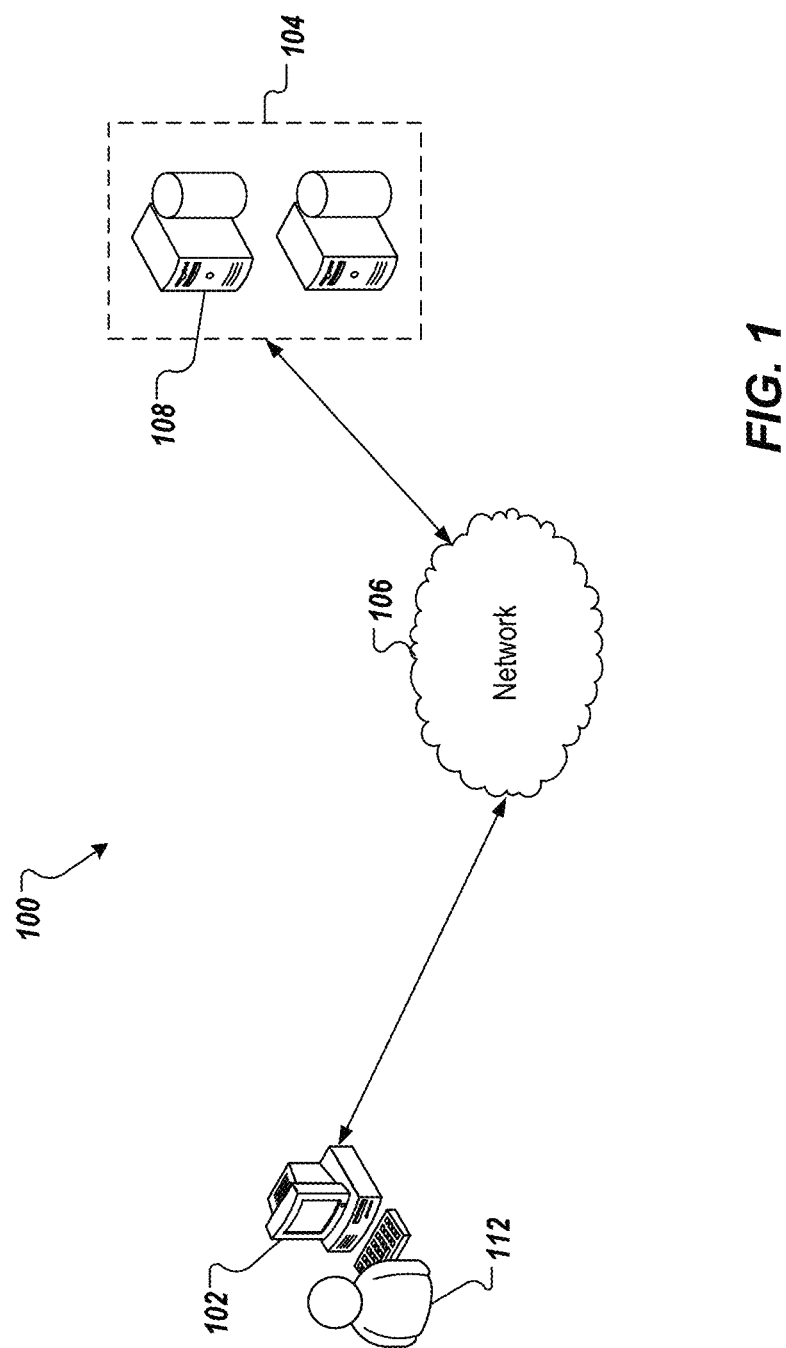
FIG. 1 depicts an example environment that can be used to execute implementations of the present disclosure.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In accordance with implementations of the present disclosure, and as noted above, the server system 104 can host an in-memory database system that uses main memory for data storage. Main memory may include one or more types of memory (e.g., DRAM, NVM) that communicates with one or more processors (e.g., CPU(s)) over a memory bus. An in-memory database system may be contrasted with database management systems that employ a disk storage mechanism. In some examples, in-memory database systems may be faster than disk storage databases, because internal optimization algorithms may be simpler and execute fewer CPU instructions. In some examples, accessing data in an in-memory database system may reduce or eliminate seek time when querying the data, providing faster and more predictable performance than disk-storage databases. An in-memory database may include a row-oriented database, in which data is stored in any number of rows or records. An in-memory database may also include a column-oriented in-memory database, in which data tables are stored as sections of columns of data (rather than as rows of data). An example in-memory database system is SAP HANA provided by SAP SE of Walldorf, Germany.

Implementations of the present disclosure are described in further detail herein with reference to SAP HANA as an example in-memory database system. It is contemplated, however, that implementations of the present disclosure can be realized with any appropriate in-memory database system.

Figure 2:
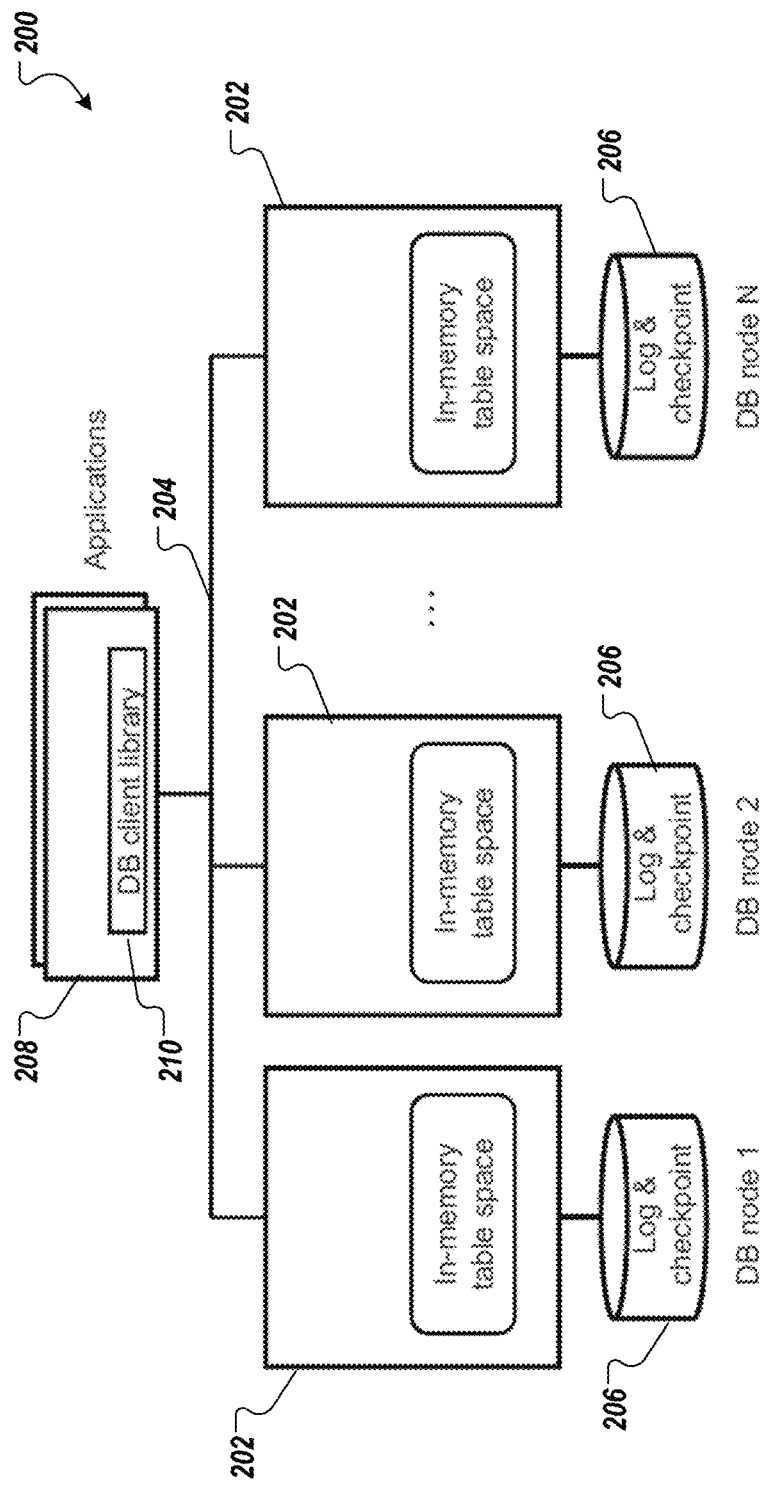
FIG. 2 depicts an example conceptual architecture in accordance with implementations of the present disclosure.

FIG. 2 depicts an example conceptual architecture 200 in accordance with implementations of the present disclosure. The example conceptual architecture 200 is representative of a simplified view of the SAP HANA distributed in-memory database system introduced above. In some examples, the example conceptual architecture 200 follows a so-called shared-nothing partitioned database architecture. In general, share-nothing refers to data that is partitioned and distributed within a database system. For the purpose of increasing the total computation resources and/or the total in-memory database space, the example conceptual architecture 200 exploits multiple independent database nodes 202, which are inter-connected with each other over a commodity network 204. Each database node 202 includes a respective data store 206, which stores logs and checkpoints for the respective node 202. In the depicted example, one or more applications 208 interact with one or more of the database nodes 202. In some examples, each application 208 can be considered a client that queries the in-memory database and includes a database client library 210.

In some implementations, the multiple database nodes 202 belong to the same database schema, and tables of each database node 202 can be distributed across the database nodes 202. In some examples, a single table can be horizontally partitioned into multiple partitions, each of which contains a disjoint set of records of the table. Each partition can be independently distributed across the multiple database nodes 202. In some implementations, for partitioning a table, a primary key is designated for the table together with a partitioning function. Example partitioning functions can include, without limitation, hash, range, or a combination thereof. In some examples, the primary key or its subset is chosen as the partition key of the table.

Regardless of how tables are partitioned and distributed, the multiple database nodes 202 belong to the same transaction domain. In this manner, strict atomicity, consistency, isolation, and durability (ACID) properties are ensured, even for cross-node transactions. For this, two-phase commit and distributed snapshot isolation are incorporated. While queries (e.g., submitted by an application 208) can be routed to any of the database nodes 202 directly by the client library 210, the client library 210 finds an optimal target database node for a given query. In some examples, this is achieved by looking up a part of a respective compiled query execution plan (QEP), which is transparently cached and refreshed at the client library 210. When execution of a QEP involves multiple nodes 202, a server-side query execution engine coordinates the distributed query processing with exchange of intermediate query results. The intermediate query results can be combined to provide a query result.

In some examples, for queries having a partition key predicate, the target database node 202 that owns the matching records can be identified by calling the partitioning function. On the other hand, queries having a non-partition key predicate (e.g., queries having a secondary key (foreign key) predicate) require a full table scan at all of the nodes 202, across which the table is distributed. To more efficiently handle such type of queries, maintaining a secondary index is necessary. In traditional database systems, a secondary index can be implemented in various manners including, without limitation, a local secondary index, a global secondary index, and a partitioned global secondary index, each of which is described in further detail herein.

FIG. 3A depicts an example architecture 300 using a local secondary index. The example architecture 300 represents a relatively straightforward way of creating a secondary index for a partitioned table having partitions 304 distributed across multiple nodes 302. In the example of FIG. 3A, a separate local index, referred to as a local secondary index, for each table partition is maintained for each node 302.

In the example of FIG. 3A, a table T1 is partitioned into three table partitions (T1.P1, T1.P2, T1.P3) 304 by taking the primary key as its partition key. Each of the three table partitions has its own local secondary index (A2) 306 that spans the records belonging to the co-located table partition. With this, the table scan can be avoided. However, the database nodes 302 should be accessed for the secondary key access query, because the partition key and the secondary key, by definition, do not match with one another other. As a result, as the number of nodes 302 where the table is distributed increases, the cost of a secondary key access query grows proportionally in terms of the network resource consumption and the CPU resource consumption in the overall system. Although the response time itself can be optimized by performing the multiple local index accesses in parallel, the number of nodes 302 that are accessed does not change.

FIG. 3B depicts an example architecture 320 using a global secondary index. Instead of maintaining multiple local indexes, as discussed above with respect to FIG. 3A, a global index (A2) 326 is provided in a node 322, as depicted in FIG. 3B. The global index 322 spans all of the partitions 304. This approach can reduce the number of nodes 302, 322 that are accessed to two at most, regardless of the number of partitions for the table. However, this approach incurs a cost in terms of resources for write transactions. This is because an update at a table partition may involve updating the corresponding global index entry located in a remote node. Moreover, because the size of global index 326 can be relatively larger than the size of a single per-partition local index (e.g., local index 306 of FIG. 3A), the node 322 owning the global index 326 will require larger space. Further, the index traversal time may take longer due to the increased index height.

Figure 3C:
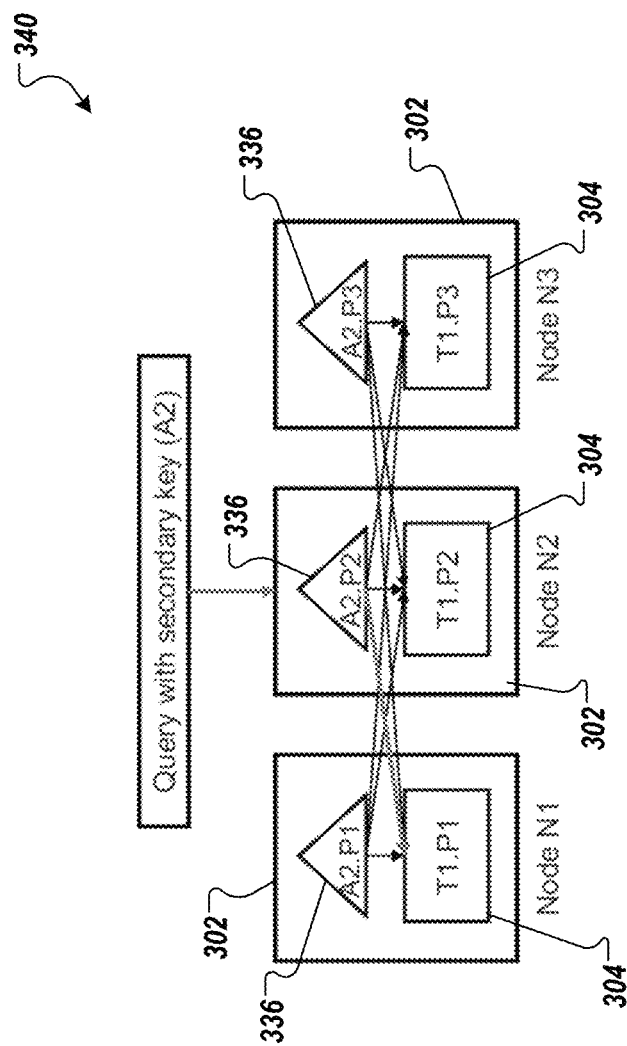

FIG. 3C depicts an example architecture 340 using a partitioned global secondary index. In the example of FIG. 3C, the global index is partitioned by the secondary key to provide a respective local global index partitions 336 at each node 302. Consequently, a local global index partition 336 may point to a record in a remote table partition 304. Compared to the non-partitioned global index (e.g., the index 306 of FIG. 3A), use of the local global index partitions 336 reduces the per-node index size and improves per-node index lookup performance. However, when a transaction updates multiple records of a table partition 304, it can lead to updating multiple local global index partitions 336. This requires resource-expensive two-phase commits with multiple remote nodes 302. Although there is the option of asynchronously maintaining the remote global index partitions, sacrificing the transactional consistency is not acceptable in particular target application domains.

Accordingly, none of the above described approaches represented in FIGS. 3A-3C could easily meet the given performance requirements of application domains that involve a substantial amount of concurrent secondary key accesses and concurrent write operations for partitioned tables.

In view of this, and as described in further detail herein, implementations of the present disclosure are directed to using a replication engine to support scalable secondary indexes in distributed database systems. Implementations of the present disclosure provide global indexing by including a global index partition at each node, each global index partition is provided as a replica table of the table (the original table that is partitioned). In some implementations, the replica table can be partitioned differently from the original table. As described in further detail herein, on a data manipulation language (DML) operation at an original table partition, the result of the DML operation will be automatically propagated and applied to the corresponding global index partition in a transaction-consistent way.

In some examples, for a single database table, there can exist multiple secondary indexes. For example, for a table including columns {A, B, C, D}, the primary key is built on column A and three secondary indexes for columns B, C, and D, respectively. For a global secondary index on B (GSI-B), the global index replica does not need to include {A, C, D}. This saves memory and to makes replication more resource efficient. Similarly, for the global secondary index on C (GSI-C), the global index replica does not need to include {A, B, D}, and for the global secondary index on D (GSI-D), the global index replica does not need to include {A, B, C}.

In some implementations, and as described in further detail herein, multiple copies of a global secondary index can be provided. For example, multiple copies of GSI-B can be provided, and can be distributed to different database nodes. In some implementations, a separate local index can be created on top of a global secondary index. For example, after partitioning GSI-B by the column B, for each of GSI-B's partitions, a local index on column B can be created to accelerate the local query processing within each particular partition of GSI-B.

Figure 4:
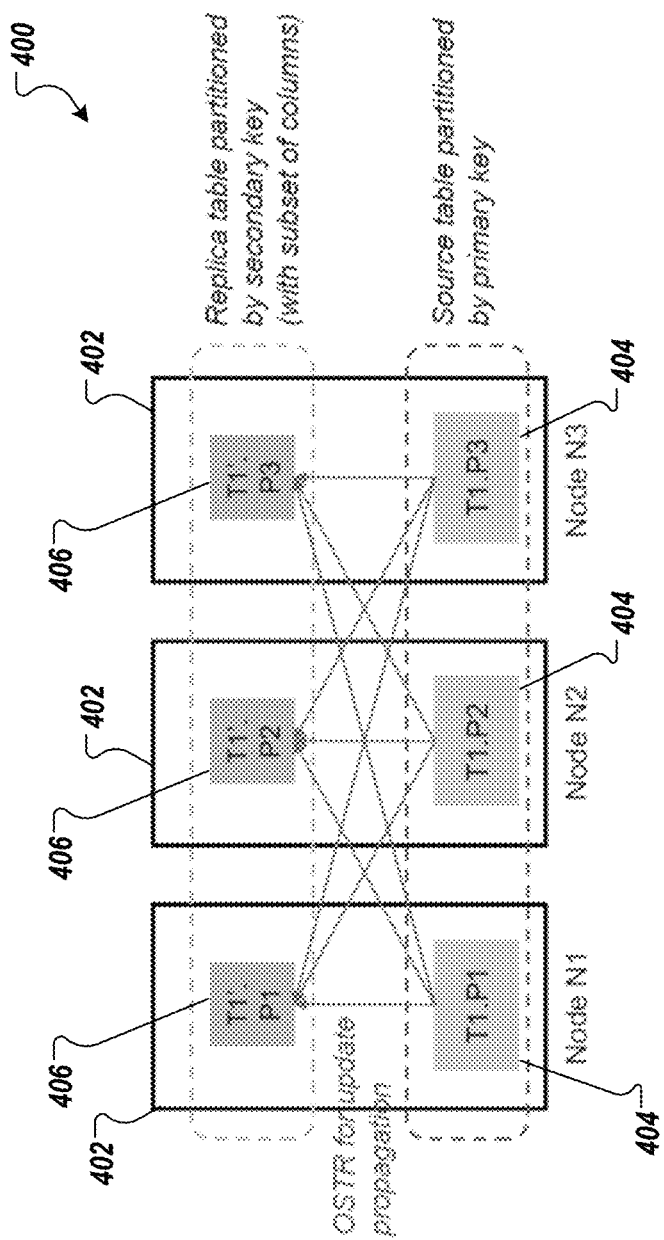
FIG. 4 depicts an example indexing architecture in accordance with implementations of the present disclosure.

FIG. 4 depicts an example indexing architecture 400 in accordance with implementations of the present disclosure. In the example of FIG. 4, nodes 402 are provided, across which partitions (T1.P1, T1.P2, T1.P3) 404 of a source table (original table T1) are distributed. The source table is partitioned using a primary key. In some implementations, a secondary index 406 is provided at each node 402 for each partition 404. In accordance with implementations of the present disclosure, each secondary index 406 is provided as a partition of the source table. More particularly, a replica (T1') of the source table (T1) is provided and is partitioned using a secondary key to provide multiple partitions (T1'.P1, T1'.P2, T1'.P3). In some examples, each partition includes a sub-set of columns of the source table. Each partition is stored at a respective node 402 as a secondary index 406.

In accordance with implementations of the present disclosure, each secondary index 406 is provided as a replica table of at least a portion of the original source table. More particularly, each replica table includes a sub-set of columns of the original source table, the sub-set of columns including one or more columns. In some implementations, a first secondary index at a first node includes a first sub-set of columns, and a second secondary index at a second node includes a second sub-set of columns, the first sub-set of columns being different than the second sub-set of columns. More plainly stated, each secondary index 406 can include replicate columns of the source table that are different than replicate columns provided in the other secondary indexes 406.

As described in detail herein, implementations of the present disclosure minimize the performance overhead resulting from write transactions by applying optimizations that are available in table replication. For example, SAP HANA implements HANA Table Replication, which enables scalable and real-time reporting over operational data by minimizing the propagation delay between a primary table and replicas of the primary table. In accordance with implementations of the present disclosure, a replication protocol is performed to propagate operations on tables (e.g., DML operations) to a respective secondary index that is provided as a replica table.

In further detail, a feature of table replication includes supporting replication of a set of designated tables only (instead of replicating the whole database). When implementing a distributed secondary index, replicas can be created only for the needed tables. Another feature of table replication includes supporting cross-format replication. To maximize the performance for online transaction processing (OLTP)/online analytical processing (OLAP)-mixed workloads, a column-oriented replica table for a row-oriented source table can be created. For this, a DML replication log is defined in a storage-neutral logical format. This provides a basis for partitioning the global index partitions (replica tables) differently from the partition key of the original source table.

Another feature of table replication includes use of optimizations to minimize the propagation delay between the primary and the replica. Example optimizations include, without limitation, lock-free parallel log replay with record-wise ordering based on so-called record version ID (RVID) and an early log shipping mechanism. These optimizations reduce the performance overhead of maintaining the global index for write transactions.

Another feature of table replication includes support of both lazy replication and eager replication modes. These are respectively referred to as Asynchronous Table Replication (ATR) and Optimistic Synchronous Table Replication (OSTR) in HANA. In some examples, OSTR ensures transactional consistency across a primary and the respective replica without any visibility delay. Consequently, implementations of the present disclosure use OSTR for replication to the global index partitions. Further, because OSTR supports synchronous transaction commit without an expensive two-phase commit required with ATR, the performance overhead of synchronously updating global indexes on write transactions can be reduced.

Figure 5A:
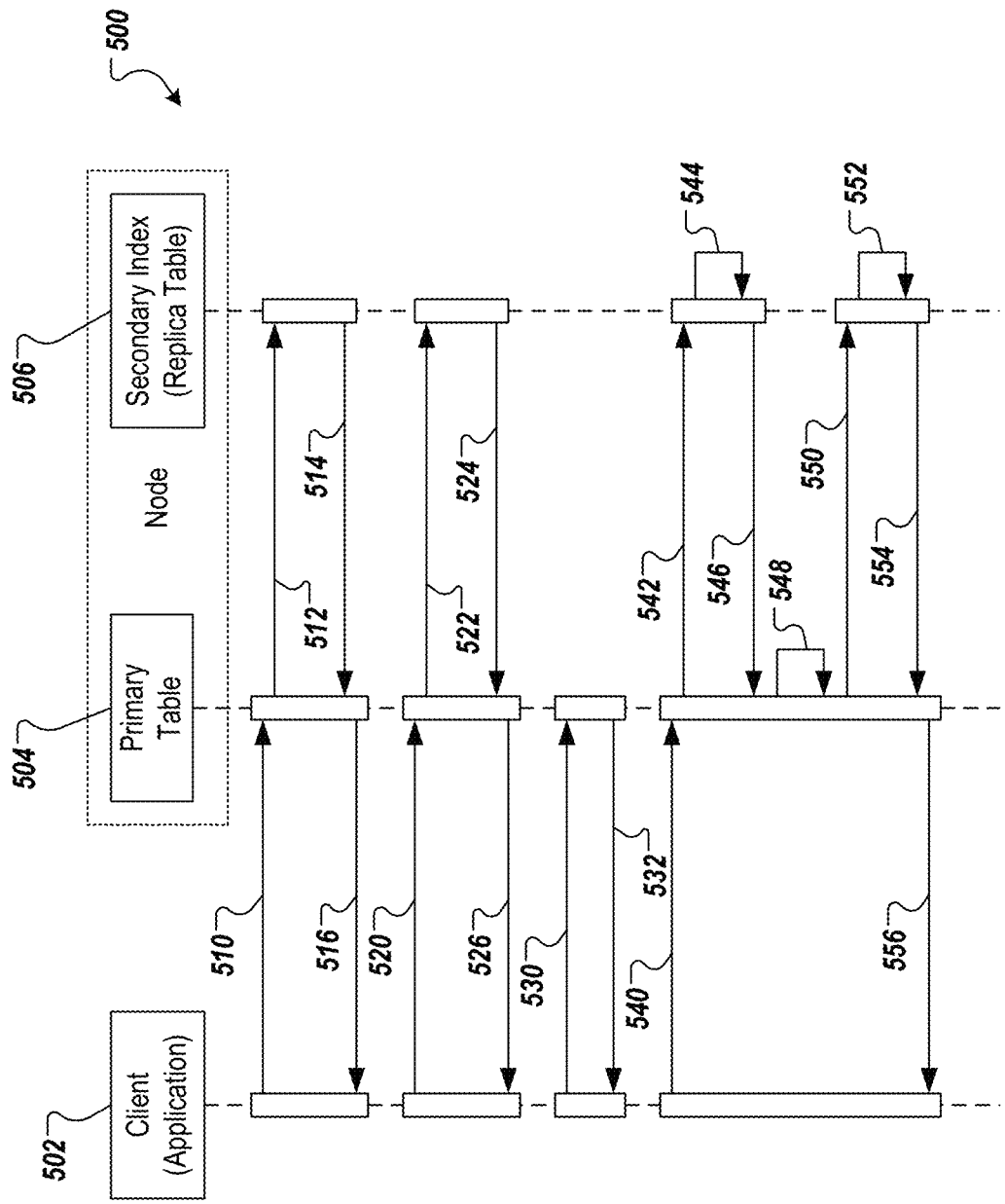
FIGS. 5A and 5B depict example signal flows representing respective replication protocols for maintaining distributed secondary indexes in accordance with implementations of the present disclosure.
Figure 5B:
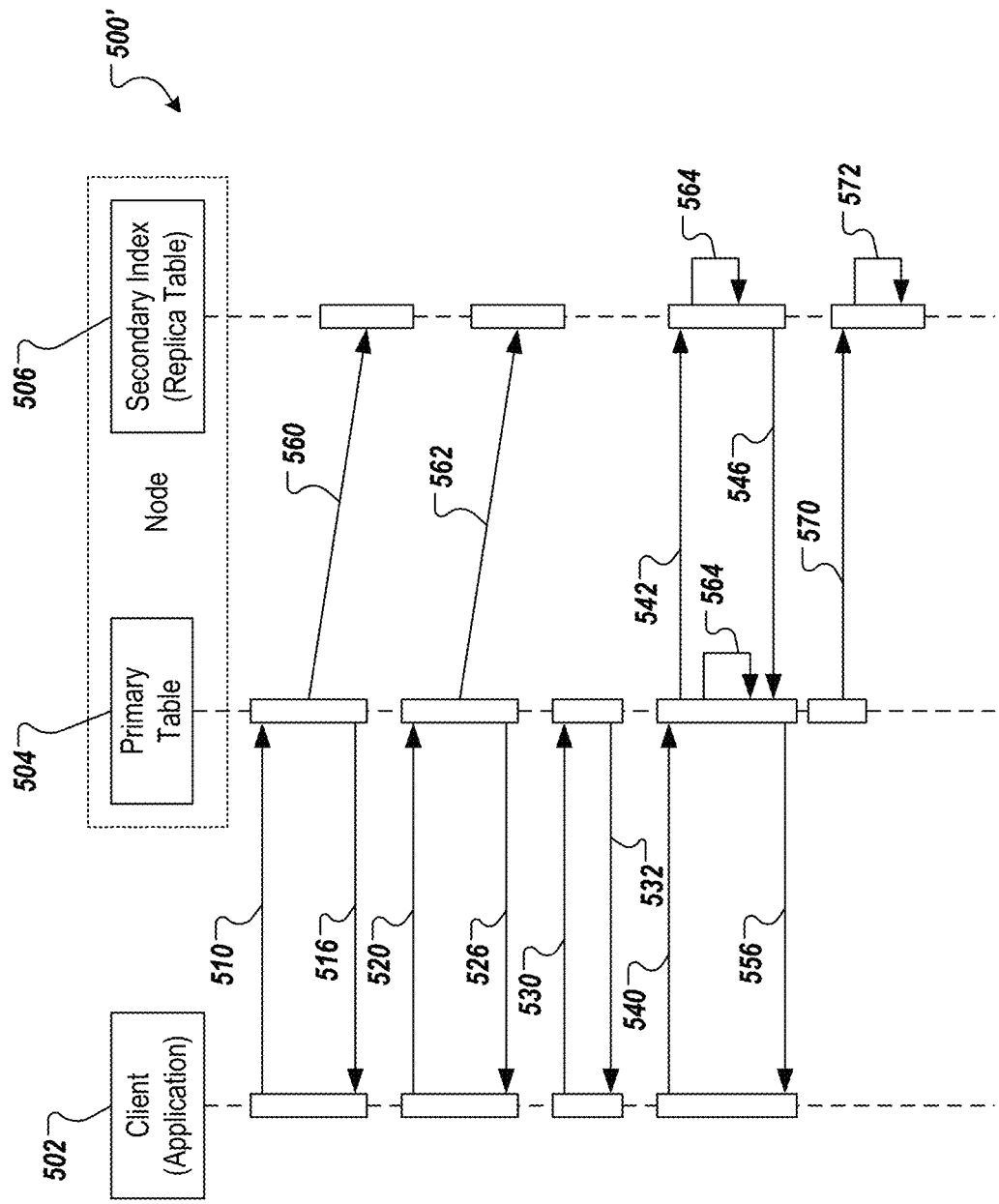

FIGS. 5A and 5B depict example signal flows 500, 500' representing respective replication protocols for maintaining distributed secondary indexes in accordance with implementations of the present disclosure. FIG. 5A depicts an example replication protocol based on synchronous DML propagation and two-phase commit (2PC). FIG. 5B depicts an example replication protocol based on OSTR. Although FIGS. 5A and 5B are described with reference to a primary table 504 and a secondary index 506 as performing certain actions, it is contemplated that a transaction, and/or a computer-executable program executing within a node perform such actions at the primary table 504 and/or at the secondary index 506.

With particular reference to FIG. 5A, the example signal flow 500 includes a client 502 (e.g., a server executing an application that interacts with a database system), the primary table 504 (e.g., a table partition that is stored in one of a plurality of nodes within the database system) and the secondary index 506. In accordance with implementations of the present disclosure, the secondary index 506 is provided as replica table of the primary table 504 and is stored with the primary table 504 on the node.

In the depicted example, the client 502 performs a transaction in the database system, the transaction including multiple DML operations (e.g., update, insert, delete). For example, the client initiates 510 a DML operation on the primary table 504. The DML operation is replicated 512 to the secondary index 506. For example, a replication engine operating on the node can replicate the DML operation to the secondary index 506. Responses 514, 516 are provided to inform execution of the DML operation on the primary table 504 and replication to the secondary index 506. In the depicted example, the client 502 initiates 520 another DML operation (e.g., update, insert, delete) on the primary table 504. The DML operation is replicated 522 to the secondary index 506. For example, the replication engine operating on the node can replicate the DML operation to the secondary index 506. Responses 524, 526 are provided to inform execution of the DML operation on the primary table 504 and replication to the secondary index 506. In the depicted example, the client 502 initiates 530 a query (e.g., select data) on the primary table 504, and a response 532 is provided to the client 502.

In the example of FIG. 5A, a two-phase commit is executed to commit the DML operations to both the primary table 504 and the secondary index 506. In some examples, the commit is executed to make all data modifications since the start of the transaction a permanent part of the database system (e.g., modifications resulting from the DML operations). The client 502 initiates 540 the commit with the primary table 504, which initiates 542 the commit with the secondary index 506. The secondary index 506 writes 544 a pre-commit log, and responds 546 to the primary table 504. The primary table 504 writes 548 a commit log and informs 550 the secondary index 506. The secondary index 506 writes a post-commit log 552 and responds to the primary table 504, which responds to the client 502 indicating that the commit has been executed.

With particular reference to FIG. 5B, the example signal flow 500' includes the client 502 (e.g., a server executing an application that interacts with a database system), the primary table 504 (e.g., a table partition that is stored in one of a plurality of nodes within the database system) and the secondary index 506, which is provided as replica table of the primary table 504 and is stored with the primary table 504 on the node. In the depicted example, the client 502 performs the transaction in the database system including the multiple DML operations, as described above with reference to FIG. 5A. However, for each DML operation, a respective asynchronous replication 560, 562 is triggered with the secondary index 506. Like FIG. 5A, the client 502 initiates 530 a query (e.g., select data) on the primary table 504, and a response 532 is provided to the client 502.

In the example of FIG. 5B, a commit is executed to commit the DML operations to both the primary table 504 and the secondary index 506. In some examples, the commit is executed to make all data modifications since the start of the transaction a permanent part of the database system (e.g., modifications resulting from the DML operations). The client 502 initiates 540 the commit with the primary table 504, which initiates 542 the commit with the secondary index 506. The secondary index 506 waits until a DML replay completes and pre-commits 564 before sending a response 546. In the meantime, the primary table 504 writes a commit log 568. The transaction signals 570 for writing 572 a post-commit log at the secondary index 506.

In some implementations, OSTR, represented in FIG. 5B, ensures that, from a transaction perspective, the replica database state remains consistent with its primary table, while minimizing the performance overhead imposed to the primary write transaction. By comparing the example signal flow 500 of FIG. 5A to the example signal flow 500' of FIG. 5B, optimizations incorporated in OSTR can be seen. In some examples, OSTR takes a hybrid approach of combining asynchronous DML replication with synchronous transaction commit. That is, a DML log entry is generated at the DML time, but its propagation to the replica is asynchronously initiated without affecting the DML response time. At the transaction commit time, the transaction proceeds to the commit processing after waiting until all its previous DML log entries are successfully applied to the replicas. While each DML involves a synchronous network round trip to the replica in the example signal flow 500 of FIG. 5A, there is little to no delay at the DML operations in the example signal flow 500' of FIG. 5B. Further, considering that multi-statement transactions are common in many enterprise database applications, the hybrid protocol represented in FIG. 5B interleaves the DML log processing with the other primary-side transaction operation (e.g., the query). This also results in minimizing the delay at the transaction commit time.

In some examples, for DML log replay, OSTR employs a lock-free parallel replay mechanism that provides scalable log replay performance at the replica tables (e.g., secondary indexes). With this, even though the concurrency of the primary-side write transaction increases, the DML replay time at the replica can be maintained at a minimum level. This also enables the commit time delay to be minimized. The parallel replay mechanism exploits the characteristics of multi-version concurrency control (MVCC) and RVID by replaying all of the DML log entries with record-level versioning instead of the in-place update.

In some examples, at the transaction commit phase, OSTR can commit the transaction after a single network round trip and one log 10 operation, which can be interleaved with each other. This can be contrasted with the example replication protocol represented in FIG. 5A, which incurs two network round trips and three log IO operations. Accordingly, OSTR leverages the fact that the secondary indexes, as table replicas, can be considered data structures that are derived from the respective primary tables. If a failure occurs in the middle of the OSTR transaction commit phase, the replica can be recovered to the latest committed state by re-synchronizing with the primary (i.e., the single point of the truth). It can be noted that, when a concurrent query tries to access a record version that is in an intermediate state, the version access is postponed until the state of the record version is finally determined into either of post-committed or aborted.

Accordingly, and as described herein, the global index is created and maintained as a replica table that is partitioned by the secondary key (or its subset) into multiple replica table partitions, each being a secondary global index partition (secondary index). To achieve this, table replication is extended to support partitioning of a replica table in a different partition scheme from the primary table. When a DML operation is performed at a primary table, its target replica partition is dynamically determined by performing a partition pruning function for the changed record. Accordingly, a set of records of a single source partition can be mapped into multiple replica partitions. However, from a record-wise perspective, a single source record is mapped to a single replica record for a given global index. At the time of recovering a replica partition, the replica partition is compared with the corresponding part of the source table, which can be selected by performing the partition pruning function on the secondary key column. It can be noted that the HANA in-memory column store inherently supports efficient processing on such a column scan.

In order to reduce memory consumption by the global index partitions (replica partitions), the table replication is extended to support column-wise, sub-table replication. With this, only a set of declared columns of the source table are replicated and maintained at the corresponding secondary global index partition (replica. In this manner, only the secondary key columns can be declared as the replicated columns for the purpose of global index. Internally, to maintain the source information for a given replica record, the RVID column is created at the replica and the same value with its source record is stored. This RVID column is used for record-level ordering during parallel log replay and replica recovery. In addition, the RVID column value can be used as a join key when a corresponding source record should be retrieved after accessing a secondary global index. In some examples, when there is sufficient amount of memory space, replicating all of the source columns can still be an option to directly retrieve the needed record without additional cross-node join operation between the global index table and the original source table.

With the OSTR-based global index management of the present disclosure, the above-described optimizations can be applied to the global index. For example, the update propagation from the source table to the global index partitions (replica partitions) are performed asynchronously, while ensuring the atomic transaction commit across the source and the global index without involving the expensive two-phase commit. Maintaining multiple global indexes for a single table is also supported by creating multiple replica tables for a single source table. When multiple global indexes are defined for a table, multiple network requests can be made for a single DML or a single commit request, but they are processed in parallel. It can be noted that a local index can be created for each global index replica table to avoid a scan operation within a single partition of the global index.

Figure 6:
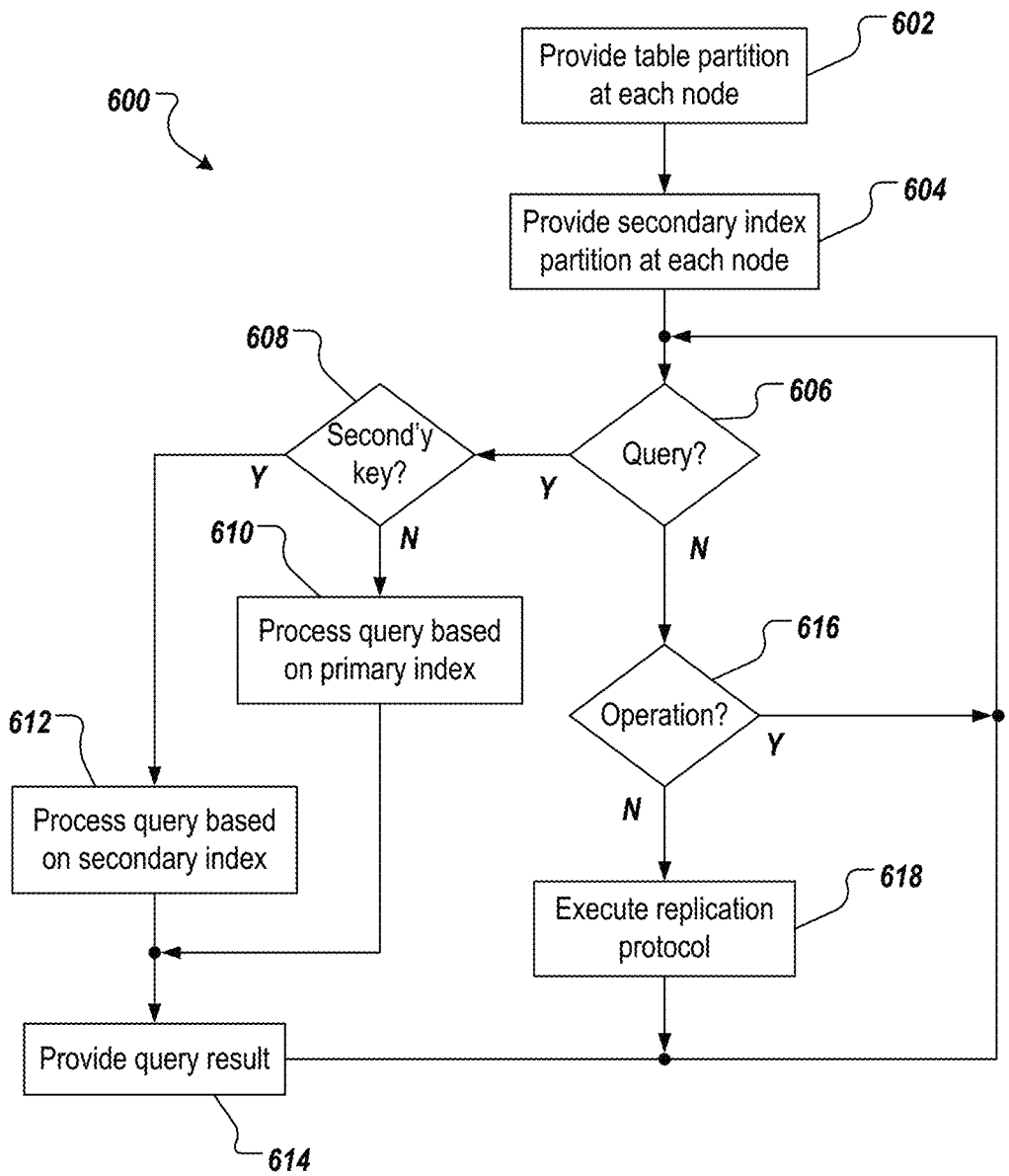
FIG. 6 depicts an example process that can be executed in accordance with implementations of the present disclosure.

FIG. 6 depicts an example process 600 that can be executed in accordance with implementations of the present disclosure. In some implementations, the example process 600 may be performed using one or more computer-executable programs executed using one or more computing devices. The example process 600 can be performed for maintaining a distributed table within a database system.

A table partition is provided at each node in a set of nodes of the database system (602). For example, a plurality of table partitions is provided, each table partition being provided by partitioning a table using a primary key. A secondary index partition is provided at each node in the set of nodes of the database system (604). For example, a plurality of secondary index partitions is provided, each secondary index partition being generated as a replicate table of at least a portion of the table. In some examples, the plurality of secondary index partitions is provided by partitioning the table using one or more secondary keys. In some examples, the secondary index partitions of the plurality of secondary index partitions collectively define a global secondary index of the table. In some examples, a first secondary index partition of the plurality of secondary index partitions includes a first set of columns of the table and a second secondary index partition of the plurality of secondary index partitions includes a second set of columns of the table, the first set of columns being different from the second set of columns.

It is determined whether a query is received (606). For example, the database system can receive a query for data stored within the database system (e.g., stored in one of the table partitions). If a query has been received, it is determined whether the query includes a secondary key (608). If the query does not include a secondary key, the query is processed using a primary index (610). If the query does include a secondary key, the query is processed based on the secondary global index (612). That is, the query is processed using one or more of the secondary index partitions. A query result is provided (614) and the example process 600 loops back.

If a query has not been received, it is determined whether an operation is executed on a table partition (610). If an operation is not executed on a table partition, the example process 600 loops back. If an operation is executed on a table partition, a replication protocol is executed (618) and the example process 600 loops back. For example, the replication protocol is executed to replicate the operation on a secondary index partition that corresponds to the table partition. In some examples, the replication protocol includes an asynchronous replication protocol (e.g., OSTR) that is absent a multi-phase commit for committing one or more changes to the table partition that result from the operation to the table partition and the secondary index partition that corresponds to the table partition. In some examples, the replication protocol executes an asynchronous replication of the one or more changes prior to committing the one or more changes to the table partition and the secondary index partition that corresponds to the table partition. In some examples, the replication protocol includes a synchronous replication protocol that ensures the one or more changes are represented in the secondary index partition that corresponds to the table partition prior to committing the one or more changes to the table partition and the secondary index partition that corresponds to the table partition. In some examples, the replication protocol executes a multi-phase commit for committing the one or more changes to the table partition and the secondary index partition that corresponds to the table partition.

Figure 7:
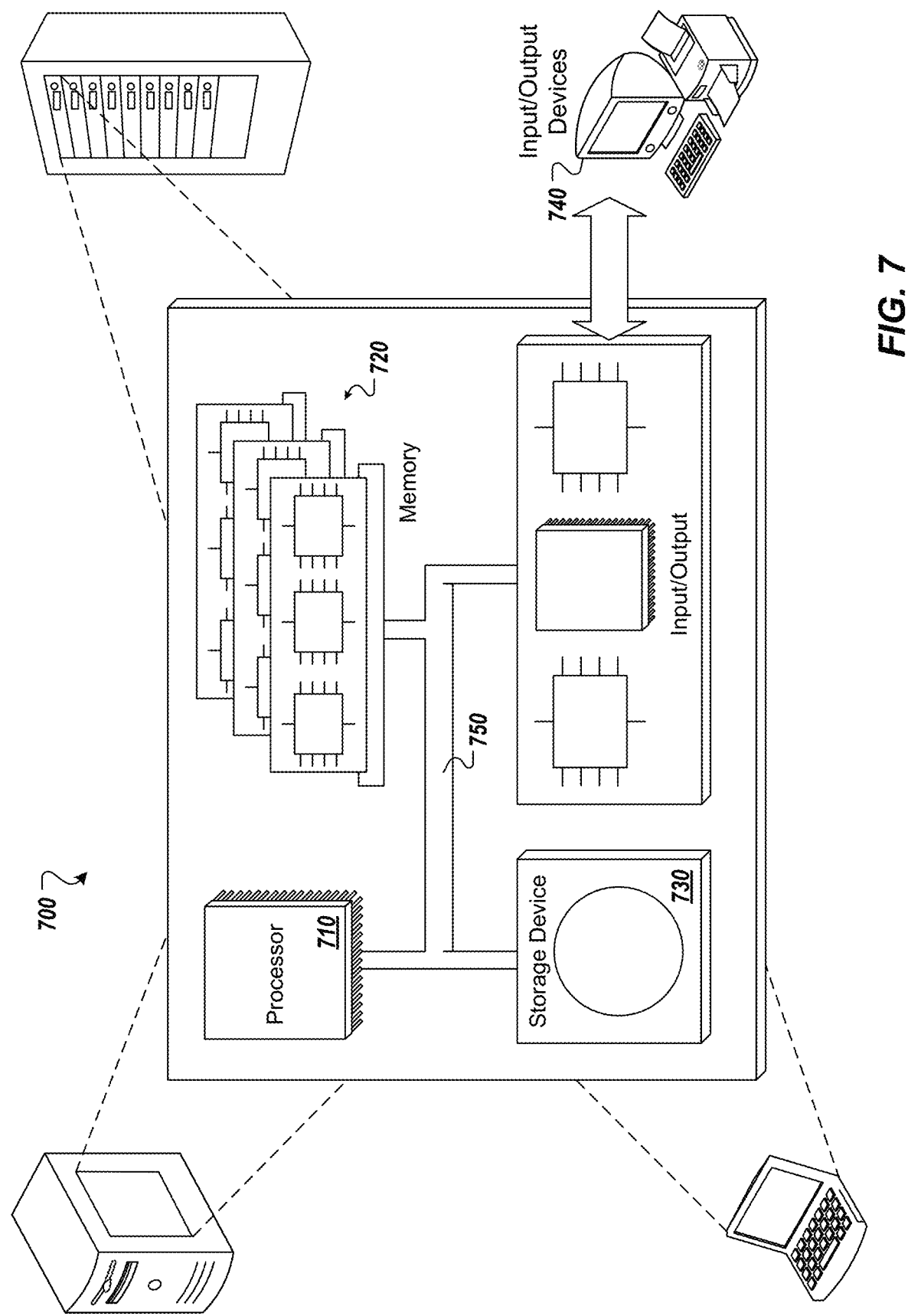
FIG. 7 is a schematic illustration of example computer systems that can be used to execute implementations of the present disclosure.

Referring now to FIG. 7, a schematic diagram of an example computing system 700 is provided. The system 700 can be used for the operations described in association with the implementations described herein. For example, the system 700 may be included in any or all of the server components discussed herein. The system 700 includes a processor 710, a memory 720, a storage device 730, and an input/output device 740. The components 710, 720, 730, 740 are interconnected using a system bus 750. The processor 710 is capable of processing instructions for execution within the system 700. In some implementations, the processor 710 is a single-threaded processor. In some implementations, the processor 710 is a multi-threaded processor. The processor 710 is capable of processing instructions stored in the memory 720 or on the storage device 730 to display graphical information for a user interface on the input/output device 740.

The memory 720 stores information within the system 700. In some implementations, the memory 720 is a computer-readable medium. In some implementations, the memory 720 is a volatile memory unit. In some implementations, the memory 720 is a non-volatile memory unit. The storage device 730 is capable of providing mass storage for the system 700. In some implementations, the storage device 730 is a computer-readable medium. In some implementations, the storage device 730 may be a floppy disk device, a hard disk device, an optical disk device, or a tape device. The input/output device 740 provides input/output operations for the system 700. In some implementations, the input/output device 740 includes a keyboard and/or pointing device. In some implementations, the input/output device 740 includes a display unit for displaying graphical user interfaces.

Implementations of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, e.g., one or more modules of computer program instructions, encoded on a computer program carrier, for execution by, or to control the operation of, data processing apparatus. The carrier may be a tangible non-transitory computer storage medium. Alternatively, or in addition, the carrier may be an artificially-generated propagated signal, e.g., a machine-generated electrical, optical, or electromagnetic signal, that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

The term "data processing apparatus" encompasses all kinds of apparatus, devices, and machines for processing data, including by way of example a programmable processor, a computer, or multiple processors or computers. Data processing apparatus can include special-purpose logic circuitry, e.g., an FPGA (field programmable gate array), an ASIC (application-specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub-programs, or portions of code.

The processes and logic flows described in this specification can be performed by one or more computers executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read-only memory or a random access memory or both. Elements of a computer can include a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more mass storage devices. The mass storage devices can be, for example, magnetic, magneto-optical, or optical disks, or solid state drives. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, implementations of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

While this specification contains many specific implementation details, these should not be construed as limitations on the scope of what is being claimed, which is defined by the claims themselves, but rather as descriptions of features that may be specific to particular implementations. Certain features that are described in this specification in the context of separate implementations can also be realized in combination in a single implementation. Conversely, various features that are described in the context of a single implementations can also be realized in multiple implementations separately or in any suitable subcombination. Moreover, although features may be described above as acting in certain combinations and even initially be claimed as such, one or more features from a claimed combination can in some cases be excised from the combination, and the claim may be directed to a subcombination or variation of a sub combination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method for providing a secondary index within a database system, the method comprising:
   providing, at each node in a set of nodes of the database system, a table partition of a plurality of table partitions, the plurality of table partitions being provided by partitioning a table using a primary key;
   providing, at each node in the set of nodes of the database system, a secondary index partition of a plurality of secondary index partitions by partitioning a replicate of the table using one or more secondary keys, each secondary index partition being absent a column of a respective primary key and one or more columns of at least one secondary key, each secondary index partition comprising a global index with respect to the one or more secondary keys and referencing each table partition of the plurality of table partitions across all nodes in the set of nodes, each table partition pointing to the secondary index partitions of all nodes in the set of nodes; and for at least one operation executed on a table partition, executing a replication protocol to replicate the at least one operation on a secondary index partition of a node in the set of nodes.

2. The method of claim 1, wherein a first secondary index partition includes a first set of columns of the table and a second secondary index partition includes a second set of columns of the table, the first set of columns being different from the second set of columns.

3. The method of claim 1, wherein the replication protocol comprises an asynchronous replication protocol that is absent a multi-phase commit for committing one or more changes to the table partition that result from the at least one operation to the table partition and the secondary index partition that corresponds to the table partition.

4. The method of claim 3, wherein the replication protocol executes an asynchronous replication of the one or more changes prior to committing the one or more changes to the table partition and the secondary index partition that corresponds to the table partition.

5. The method of claim 1, wherein the replication protocol comprises a synchronous replication protocol that ensures the one or more changes are represented in the secondary index partition that corresponds to the table partition prior to committing the one or more changes to the table partition and the secondary index partition that corresponds to the table partition.

6. The method of claim 5, wherein the replication protocol executes a multi-phase commit for committing the one or more changes to the table partition and the secondary index partition that corresponds to the table partition.

7. The method of claim 1, wherein the secondary index partitions of the plurality of secondary index partitions collectively define a global secondary index of the table.

8. A non-transitory computer-readable storage medium coupled to one or more processors and having instructions stored thereon which, when executed by the one or more processors, cause the one or more processors to perform operations for providing a secondary index within a database system, the operations comprising:

providing, at each node in a set of nodes of the database system, a table partition of a plurality of table partitions, the plurality of table partitions being provided by partitioning a table using a primary key;

providing, at each node in the set of nodes of the database system, a secondary index partition of a plurality of secondary index partitions by partitioning a replicate of the table using one or more secondary keys, each secondary index partition being absent a column of a respective primary key and one or more columns of at least one secondary key, each secondary index partition comprising a global index with respect to the one or more secondary keys and referencing each table partition of the plurality of table partitions across all nodes in the set of nodes, each table partition pointing to the secondary index partitions of all nodes in the set of nodes; and for at least one operation executed on a table partition, executing a replication protocol to replicate the at least one operation on a secondary index partition of a node in the set of nodes.

9. The computer-readable storage medium of claim 8, wherein a first secondary index partition includes a first set of columns of the table and a second secondary index partition includes a second set of columns of the table, the first set of columns being different from the second set of columns.

10. The computer-readable storage medium of claim 8, wherein the replication protocol comprises an asynchronous replication protocol that is absent a multi-phase commit for committing one or more changes to the table partition that result from the at least one operation to the table partition and the secondary index partition that corresponds to the table partition.

11. The computer-readable storage medium of claim 10, wherein the replication protocol executes an asynchronous replication of the one or more changes prior to committing the one or more changes to the table partition and the secondary index partition that corresponds to the table partition.

12. The computer-readable storage medium of claim 8, wherein the replication protocol comprises a synchronous replication protocol that ensures the one or more changes are represented in the secondary index partition that corresponds to the table partition prior to committing the one or more changes to the table partition and the secondary index partition that corresponds to the table partition.

13. The computer-readable storage medium of claim 12, wherein the replication protocol executes a multi-phase commit for committing the one or more changes to the table partition and the secondary index partition that corresponds to the table partition.

14. The computer-readable storage medium of claim 8, wherein the secondary index partitions of the plurality of secondary index partitions collectively define a global secondary index of the table.

15. A system, comprising:
one or more computers; and
a computer-readable storage device coupled to the computing device and having instructions stored thereon which, when executed by the computing device, cause the computing device to perform operations for providing a secondary index within a database system, the operations comprising:

providing, at each node in a set of nodes of the database system, a table partition of a plurality of table partitions, the plurality of table partitions being provided by partitioning a table using a primary key;

providing, at each node in the set of nodes of the database system, a secondary index partition of a plurality of secondary index partitions by partitioning a replicate of the table using one or more secondary keys, each secondary index partition being absent a column of a respective primary key and one or more columns of at least one secondary key, each secondary index partition comprising a global index with respect to the one or more secondary keys and referencing each table partition of the plurality of table partitions across all nodes in the set of nodes, each table partition pointing to the secondary index partitions of all nodes in the set of nodes; and for at least one operation executed on a table partition, executing a replication protocol to replicate the at least one operation on a secondary index partition of a node in the set of nodes.

16. The system of claim 15, wherein a first secondary index partition includes a first set of columns of the table and a second secondary index partition includes a second set of columns of the table, the first set of columns being different from the second set of columns.

17. The system of claim 15, wherein the replication protocol comprises an asynchronous replication protocol that is absent a multi-phase commit for committing one or more changes to the table partition that result from the at least one operation to the table partition and the secondary index partition that corresponds to the table partition.

18. The system of claim 17, wherein the replication protocol executes an asynchronous replication of the one or more changes prior to committing the one or more changes to the table partition and the secondary index partition that corresponds to the table partition.

19. The system of claim 15, wherein the replication protocol comprises a synchronous replication protocol that ensures the one or more changes are represented in the secondary index partition that corresponds to the table partition prior to committing the one or more changes to the table partition and the secondary index partition that corresponds to the table partition.

20. The system of claim 19, wherein the replication protocol executes a multi-phase commit for committing the one or more changes to the table partition and the secondary index partition that corresponds to the table partition.

\* \* \* \* \*